United States Patent
Jubert et al.

(10) Patent No.: US 8,528,600 B2
(45) Date of Patent: Sep. 10, 2013

(54) HYDRAULIC VALVE

(75) Inventors: Xavier Jubert, Billancourt (FR); Jérôme Fraval, Viroflay (FR); Sébastien Meziane, Les Ulis (FR); Sébastien Ernis, Chatenay Malabry (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 196 days.

(21) Appl. No.: 13/152,774

(22) Filed: Jun. 3, 2011

(65) Prior Publication Data

US 2011/0297262 A1 Dec. 8, 2011

(30) Foreign Application Priority Data

Jun. 4, 2010 (FR) ...................................... 10 54430

(51) Int. Cl.
*F16K 11/07* (2006.01)
*F16K 11/074* (2006.01)
*F16K 39/04* (2006.01)

(52) U.S. Cl.
USPC ................................ 137/625.66; 137/625.69

(58) Field of Classification Search
USPC ................. 137/625.69, 625.66, 625.2, 625.6; 251/31, 282
See application file for complete search history.

(56) References Cited

U.S. PATENT DOCUMENTS

| 2,648,313 | A | | 8/1953 | Clifton | |
|---|---|---|---|---|---|
| 3,198,212 | A | * | 8/1965 | Junck et al. | 137/625.37 |
| 4,941,508 | A | * | 7/1990 | Hennessy et al. | 137/625.69 |
| 2007/0144596 | A1 | * | 6/2007 | Lohrberg et al. | 137/625.69 |

FOREIGN PATENT DOCUMENTS

| DE | 28 33 358 A1 | 2/1980 |
|---|---|---|
| DE | 31 29 594 A1 | 2/1983 |
| DE | 198 47 703 A1 | 4/2000 |
| GB | 1909 02195 A | 7/1909 |

* cited by examiner

*Primary Examiner* — John Rivell
*Assistant Examiner* — Kevin Barss
(74) *Attorney, Agent, or Firm* — Sughrue Mion, PLLC

(57) ABSTRACT

The invention relates to a hydraulic valve comprising a body in which a bore is formed in order to receive a sleeve that includes sealing seats that cooperate with a wall of the bore to define hydraulically isolated chambers that are connected to hydraulic ports in the body, the sleeve including connection holes in order to connect at least certain chambers with the inside of the sleeve and receiving a movable element that is slidable between two end positions in order to slide in leak-tight manner against an inside wall of the sleeve, wherein the sleeve includes at least one regulator hole that opens out inside the sleeve in such a manner as to be the first bore to be uncovered or the last bore to be blocked by one of the fitted portions of the movable element when said element slides from one position to another, said fitted portion having at least one face portion that presents a setback that passes over the regulator hole.

9 Claims, 2 Drawing Sheets

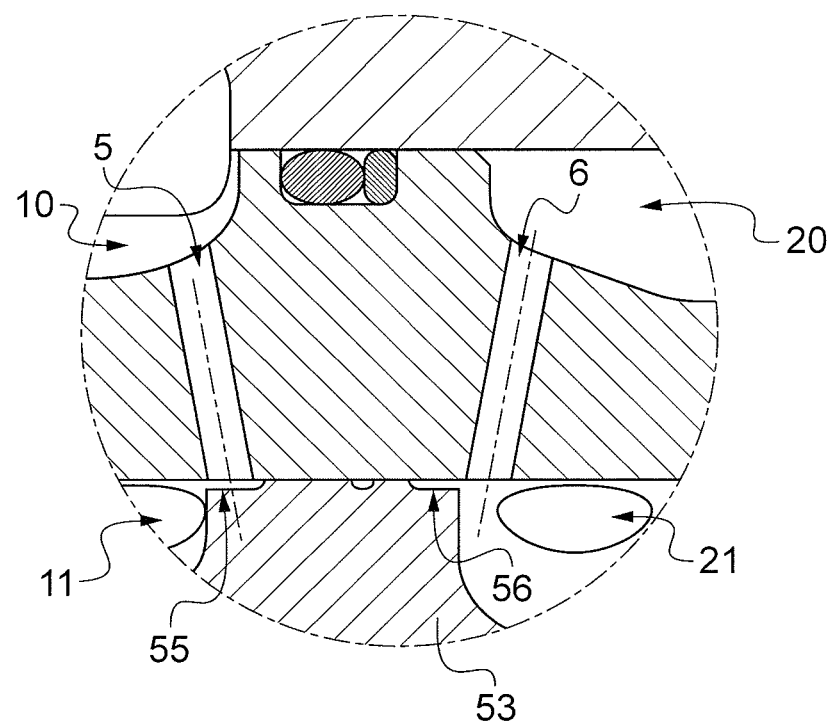

HYDRAULIC VALVE

TECHNOLOGICAL BACKGROUND OF THE INVENTION

Directional control valves are known that comprise a sleeve engaged inside a bore of a hydraulic actuator or body in order to cooperate with said body to define a plurality of hydraulically isolated chambers. Hydraulic ports in the body make it possible to put said chambers into communication with the various hydraulic components of the circuit. The sleeve includes various holes so as to put the chambers into communication with the inside of the sleeve. The sleeve receives a slide that includes portions that are fitted for sliding in leaktight manner against an inside wall of the sleeve and that define between them movable chambers that put the isolated chambers into communication with one another via the holes in the sleeve, and that do so selectively as a function of the position of the slide inside the sleeve.

OBJECT OF THE INVENTION

In certain applications, it is important to avoid the pressure peaks that can occur when one of the fitted portions passes over a hole in the sleeve. The invention aims to provide a constructional arrangement that makes it possible to reduce the risk of a pressure peak under such circumstances.

BRIEF DESCRIPTION OF THE INVENTION

In view of achieving this aim, the invention proposes a hydraulic valve comprising a body in which a bore is formed in order to receive a sleeve that includes sealing seats that cooperate with a wall of the bore to define hydraulically isolated chambers that are connected to hydraulic ports in the body, the sleeve including connection holes in order to connect at least certain chambers with the inside of the sleeve and receiving a movable element that is slidable between two end positions, the slide includes fitted portions for sliding in leaktight manner against an inside wall of the sleeve. According to the invention, the sleeve includes at least one regulator hole that opens out inside the sleeve in such a manner as to be the last bore to be blocked or the first bore to be uncovered by one of the fitted portions of the movable element when said element slides from one position to another, said fitted portion having at least one setback face portion passing over the regulator hole.

Thus, when the movable element moves (e.g. a slide or a poppet) tending to put one of the hydraulic ports into communication with one of the chambers, the regulator hole is thus opened gradually, first by the setback of the fitted portion as it moves past, then by the fitted part proper of the fitted portion as it moves past. The regulator hole is thus opened gradually and hydraulic communication is established with a reduced risk of a pressure peak. The movement of the slide thus continues in order to uncover the connection holes for putting the hydraulic port concerned fully into communication with the corresponding chamber.

In contrast, during movement of the movable element tending to isolate one of the hydraulic ports from one of the chambers, said fitted portion passes over the connection holes of the chamber concerned in order to block them, so that at the end of the movement, only the regulator hole is not yet blocked, allowing pressure to be balanced between the chamber concerned and the inside of the sleeve. The regulator hole is thus closed gradually, firstly by the setback of the fitted portion passing over it, then by the fitted part proper of the fitted portion. The regulator hole is thus gradually blocked and hydraulic closure is implemented with a reduced risk of a pressure peak.

BRIEF DESCRIPTION OF THE FIGURES

The invention can be better understood in light of the following description of a particular implementation with reference to the figures of the accompanying drawings in which:

FIG. 4 is a view of a detail of FIG. 1, showing one of the regulator holes and the setback of the slide.

DETAILED DESCRIPTION OF THE FIGURES

The valve of the invention is particularly suited to being incorporated in a hydraulic circuit for operating aircraft landing gear. By way of example, this valve is used for powering actuators making it possible to deploy and retract an undercarriage. In this type of application, it is conventional to observe pressure peaks during operation of the sliding movable element of the valve, and that may lead to hammering and to needless wear of the hydraulic circuit. However, although particularly adapted to this application, the valve of the invention may be used in other hydraulic circuits in which it is desired to minimize the risk of pressure peaks.

Figure 1:
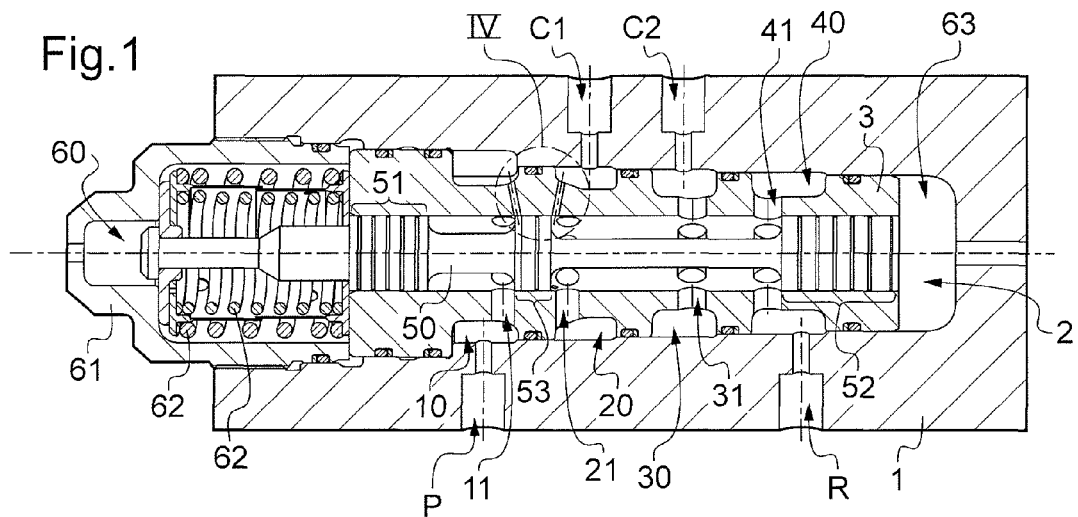
FIG. 1 is a longitudinal view showing a slide valve in a particular embodiment of the invention in section on a plane containing the regulator holes, the slide being in an intermediate rest position between two end positions.

With reference to FIG. 1, the valve in a particular embodiment of the invention comprises a body 1 in which a bore 2 has been formed in order to receive a sleeve 3. The body 1 and the sleeve 3 comprise various sealing seats that cooperate, with one another and with the inside wall of the bore 2, and with the outside wall of the sleeve 3, to define hydraulic chambers 10, 20, 30, and 40 that are connected respectively to a pressure port P, to an active port C1, to an active port C2, and to a return port R. These ports are connected respectively to a source of pressure, to a first hydraulic line leading, for example, to the unobstructed chamber of an actuator, to a second hydraulic line leading, for example, to the annular chamber of the same actuator, and finally to a return.

The sleeve 3 includes connection holes 11, 21, 31, 41, that connect each of the chambers 10, 20, 30, 40 with the inside of the sleeve 3. In this example, there are six connection holes per chamber, they are regularly distributed, and, in this example, they extend along radial directions that are perpendicular to a longitudinal axis of the sleeve 3.

Figure 2:
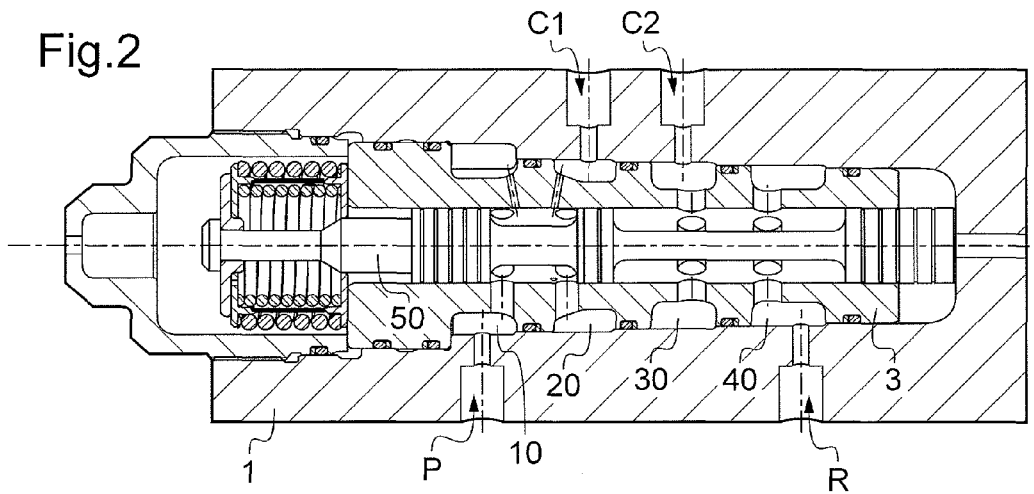
FIG. 2 is a longitudinal view of the valve shown in FIG. 1, in section on a plane containing the connection holes of the sleeve, and showing the slide in one of the end positions.
Figure 3:
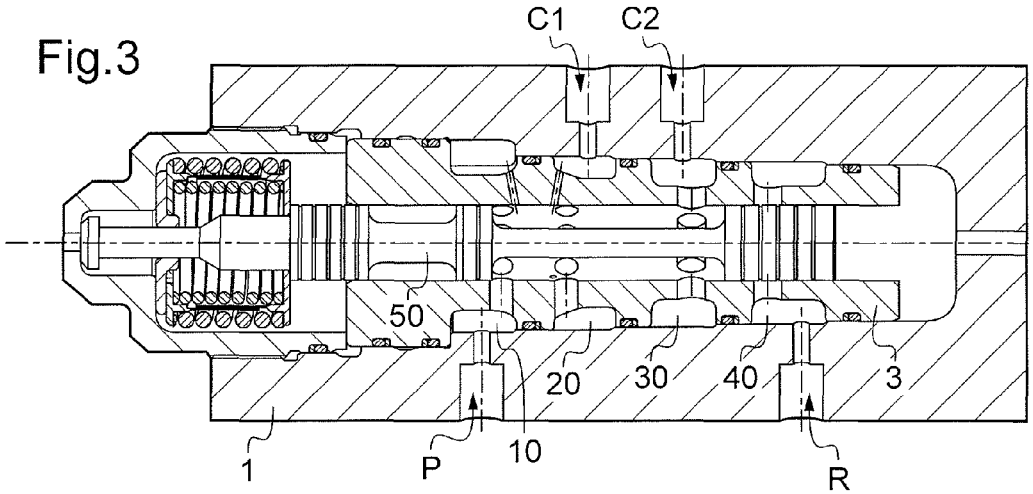
FIG. 3 is a view analogous to that shown in FIG. 1, showing the slide in the other end position.

A movable element, in this example a slide 50, is disposed inside a sleeve 3 in order to slide between two end positions shown in FIGS. 2 and 3, passing via a stable intermediate position shown in FIG. 1. The slide 50 includes three fitted portions 51, 52, 53 that bear in leaktight manner against the inside wall of the sleeve 3 and form guide bearings for guiding the slide 50.

The zones extending in the sleeve between the fitted portions cooperate with the slide to form movable connection chambers in order to put the chambers of the valve selectively into hydraulic communication in the following configurations:

when the slide is in the intermediate position as shown in FIG. 1, the chamber 10 is isolated from the other chambers, whereas the chambers 20, 30, and 40 are put into communication with one another. The pressure port P is thus isolated, whereas the ports C1 and C2 are connected to the return port R;

when the slide is in the first end position shown in FIG. 2, the chamber 10 is in communication with the chamber 20, whereas the chamber 30 is in communication with the chamber 40. The port C1 is thus connected to the pressure port P, whereas the port C2 is connected to the return port R; and when the slide is in the second end position shown in FIG. 3, the chamber 10 is in communication with the chambers 20 and 30, whereas the chamber 40 is isolated from the other chambers. The ports C1 and C2 are thus both connected to the pressure port P.

A first control chamber 60 is organized in a threaded cap 61 that becomes engaged in an inside thread of the body that is coaxial with the bore 2 and that holds the sleeve in position. Applying pressure to the first control chamber moves the slide 60 towards the first end position against return springs 62 urging the slide back towards the intermediate position of FIG. 1. A second control chamber 63 is organized at one end of the slide directly in the end wall of the bore 2, and applying pressure thereto causes the slide to move towards the second end position against return springs 62.

In the invention, one of the fitted portions 53 of the slide 50 includes face portions that present setbacks 55, 56 as shown in FIG. 4. The setbacks are exaggerated in the figure and in reality they are very slight, of the order of a few tenths of a millimeter. Preferably, they are cylindrical, i.e. made along the entire periphery of the fitted portion 53. Still in the invention, the sleeve 3 includes two regulator holes 5 and 6 that, in this example, are of diameter that is less than the diameter of the connection holes. The regulator hole 5 opens out to the chamber 10 that is connected to the pressure port P, whereas the regulator hole 6 opens out to the chamber 20 that is connected to the active port C1. In this example, the regulator holes are inclined so as to open out inside the sleeve 3 in such a manner as to be the first hole to be uncovered by the fitted portion 53 during movement of the slide, or to be the last hole to be blocked by the fitted portion 53 during movement of the slide.

More precisely, and starting from the first end position shown in FIG. 2, return of the slide towards the stable intermediate position assumes that the fitted portion 53 starts by passing over the connection holes 21 in order to block them. When said connection holes are blocked, the regulator hole 6 is not yet blocked, so that it continues to be possible for pressure to be balanced between the chamber 20 and the chamber 10. Then, as the slide 50 continues to move, the setback 55 passes over the regulator hole 6 in order to start blocking it. However, said blocking is gradual, since, although obstructed more and more completely by the fitted portion of the slide, the setback 55 prevents the regulator hole 6 being blocked completely. However, as the slide advances, communication between the chamber 20 and the chamber 10 becomes gradually more and more limited. Said communication is finally interrupted when the fitted part proper of the fitted portion 53 passes over the regulator hole 6. This progressivity leads to the chamber 20 being isolated very gradually from the chamber 10, while minimizing the risks of a pressure peak.

In the same manner, starting from the second end position shown in FIG. 3, return of the slide towards the stable intermediate position assumes that the fitted portion 53 starts by passing over the connection holes 11 in order to block them. When said connection holes are blocked, the regulator hole 5 is not yet blocked, so that it continues to be possible for pressure to be balanced between the chamber 10 and the chamber 20. Then, as the slide 50 continues to move, the setback 56 passes over the regulator hole 5 in order to start blocking it. However, said blocking is gradual, since, although obstructed more and more completely by the fitted portion of the slide, the setback 55 prevents the regulator hole 5 being blocked completely. However, as the slide advances, communication between the chamber 10 and the chamber 20 becomes gradually more and more limited. Said communication is finally interrupted when the fitted part proper of the fitted portion 53 passes over the regulator hole 5. This progressivity leads to the chamber 20 being isolated very gradually from the chamber 10, while minimizing the risks of a pressure peak.

Conversely, when the slide 50 moves from the stable position towards the first end position shown in FIG. 2, the fitted portion 53 starts by gradually uncovering the regulator hole 6. The setback 55 passes over the regulator hole 6 in order to start uncovering it. However, said uncovering is gradual, as the setback 55 moves relative to the regulator hole 6 until the regulator hole 6 is fully uncovered. Pressure is thus balanced gradually, without any pressure peak. The connection holes are then uncovered in order to enable substantial amounts of fluid to flow, with pressure balance already established.

In the same manner, when the slide 50 moves from the stable position towards the second end position shown in FIG. 3, the fitted portion 53 starts by gradually uncovering the regulator hole 5. The setback 56 passes over the regulator hole 5 in order to start uncovering it. However, said uncovering is gradual, as the setback 56 moves relative to the regulator hole 5 until the regulator hole 5 is fully uncovered. Pressure is thus balanced gradually without a pressure peak. The connection holes are then uncovered in order to enable substantial amounts of fluid to flow, with pressure balance already established.

The invention is not limited to the description given above, but encompasses more generally any variant coming within the ambit defined by the claims.

In particular, although a valve with two regulator holes and two setbacks is shown, in such a manner that regulation takes place in both movement directions of the valve, naturally, use could be made of only one regulator hole and setback pair, if the problem of pressure peaks requires treatment for only a single movement direction of the slide.

Naturally, it is also possible to modulate damping of pressure peaks by acting on the diameter of the regulator holes and/or the number of regulator holes opening out to the same chamber.

Thus, the sleeve may include a plurality of regulator holes opening out to the same chamber, the regulator holes being distributed radially along the periphery of the sleeve in order to be uncovered or re-covered substantially simultaneously. Together, the regulator holes opening out to the same chamber form a total flow area, the value of which is a function of the desired damping.

Naturally, the arrangements of the invention apply to any type of hydraulic valve having at least two positions. The invention thus applies to slide valves, as shown above, but also to poppet valves, and more generally, to any valve including a movable sliding element passing over holes.

What is claimed is:

1. A hydraulic valve comprising a body in which a bore is formed in order to receive a sleeve that includes sealing seats that cooperate with a wall of the bore to define hydraulically isolated chambers that are connected to hydraulic ports in the body, the sleeve including connection holes in order to connect at least certain chambers with the inside of the sleeve and receiving a movable element that is slidable between two end positions via an intermediate position, said movable element comprising fitted portions each adapted in order to slide in leaktight manner against an inside wall of the sleeve, two of said chambers being adjacent, said adjacent chambers being selectively:

put into communication when said movable element is moved in each of said end positions; and isolated from each other by one of said fitted portions when said movable element is moved in said intermediate position;

wherein the sleeve includes at least two regulator holes that respectively open out inside said respective adjacent chambers;

wherein said fitted portion isolating the adjacent chambers from each other when said movable element is moved in said intermediate position, includes face portions each presenting a setback, said setbacks being disposed in order to pass over the regulator holes when the movable element is moved between its end positions; and wherein said regulator holes open out inside the sleeve in such a manner as to be the first bore to be uncovered or the last bore to be blocked by said fitted portion presenting said setbacks when said movable element slides between its intermediate position and anyone of its end positions.

2. A hydraulic valve according to claim 1, wherein said setbacks are made along the entire periphery of the fitted portion.

3. A hydraulic valve according to claim 2, wherein said setbacks are cylindrical.

4. A hydraulic valve according to anyone of claims 1 to 3, wherein said each of said connection holes present a diameter and each of said regulator holes present a diameter that is less than the diameter of the connection holes.

5. A hydraulic valve according to anyone of claims 1 to 3, wherein said intermediate position is a stable position.

6. A hydraulic valve according to anyone of claims 1 to 3, wherein said movable element is a slide.

7. A hydraulic valve according to claim 4, wherein said intermediate position is a stable position.

8. A hydraulic valve according to claim 4, wherein said movable element is a slide.

9. A hydraulic valve according to claim 5, wherein said movable element is a slide.

\* \* \* \* \*